A. M. REMINGTON.
BLADE HOLDING DEVICE.
APPLICATION FILED SEPT. 1, 1921.

1,405,867.

Patented Feb. 7, 1922.

Inventor:
Alfred M. Remington
By Roberts Roberts & Cushman
his attys.

UNITED STATES PATENT OFFICE.

ALFRED M. REMINGTON, OF FITCHBURG, MASSACHUSETTS, ASSIGNOR TO SIMONDS MANUFACTURING COMPANY, OF FITCHBURG, MASSACHUSETTS, A CORPORATION OF MASSACHUSETTS.

BLADE-HOLDING DEVICE.

1,405,867. Specification of Letters Patent. Patented Feb. 7, 1922.

Application filed September 1, 1921. Serial No. 497,698.

*To all whom it may concern:*

Be it known that I, ALFRED M. REMINGTON, a citizen of the United States of America, and resident of Fitchburg, in the county of Worcester and State of Massachusetts, have invented new and useful Improvements in Blade-Holding Devices, of which the following is a specification.

This invention relates to tools in which a blade is adjustable in respect to a holder; for example, to compass saws in which the blade is adjustable in respect to the handle or grip.

Objects of the invention are to provide for adjusting the blade relative to the handle, and to do this in such a way as to permit angular adjustment in a rotative sense about axes in two dimensions; to provide for locking the blade securely against movement when in adjusted position; and to provide for these qualities by providing a light, simple and strong connecting device adapted to continue to function properly under hard usage.

In the preferred form selected for explanation the connecting device comprises a clamp bolt for closing upon the blade clamping jaws forming a part of the handle, the connecting device comprising means holding the blade locked in rotative adjustment in respect to the bolt as a center, and adapted to so lock the blade whether it is entered in the clamping jaw with its useful edge turned inward or turned outward in respect to the handle.

In the accompanying drawing—

Figure 1:
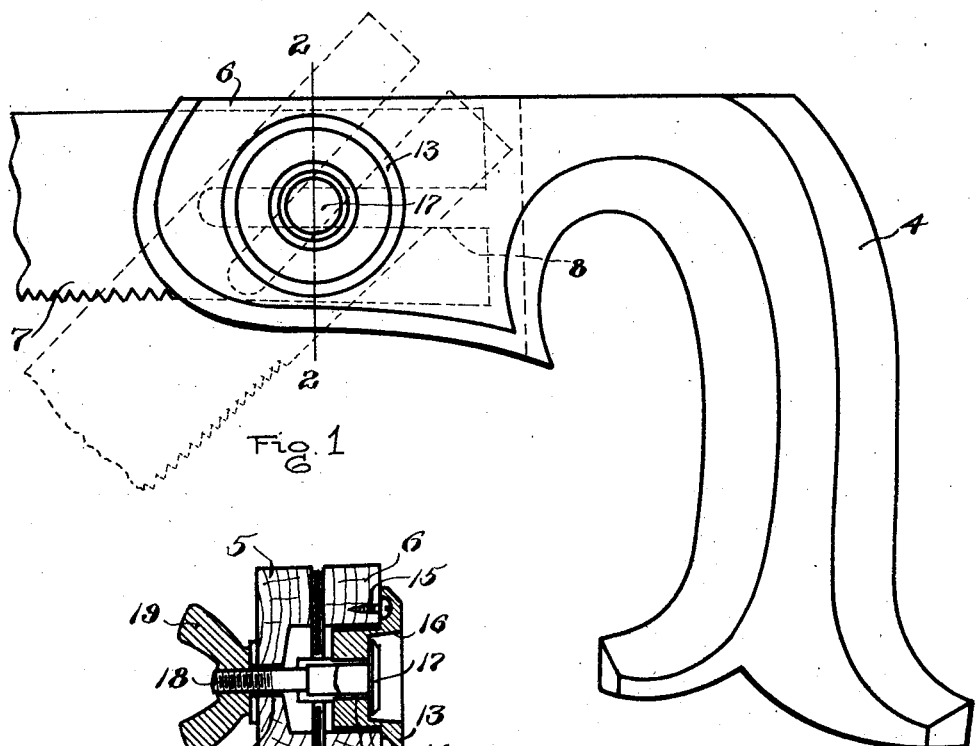
Fig. 1 is an elevation of a compass saw embodying the features of my invention showing the blade in two positions.

The particular embodiment of the invention selected for the purpose of illustration comprises a compass saw having the usual handle 4 bifurcated at the forward portion to form clamping jaws 5 and 6, between which the saw blade 7 is adapted to be received. Blade 7 has a longitudinal open-ended slot 8 which receives opposite squared lugs 9 on the inner end of a cylindrical locking member 10 received in a bore 11 extending transversely through one jaw 6, and partially through the other jaw 5. A reduced concentric hole 12 extends completely through jaw 5. Cylindrical member 10 has on the end opposite to lugs 9 a circumferential flange 13 which is adapted to contact with the face of handle 4. On the inner side of flange 13 countersinks 14 cooperate with a stud 15 fixed in the adjacent portion of the handle. This stud may be the rounded head of a screw as shown in the drawing. The outer end of cylindrical member 10 adjacent flange 13 is axially countersunk at 16 and provided with a squared axial bore $16^a$ to receive the head 17 and squared portion 21 respectively of a clamping bolt 18 adapted to extend through the bore $16^a$ and hole 12 and far enough beyond jaw 5 to receive a washer 20 and thumb-nut 19, so that the bifurcated ends or jaws 5 and 6 may be clamped tightly in contact with the blade 7 upon setting up thumb-nut 19.

Figure 2:
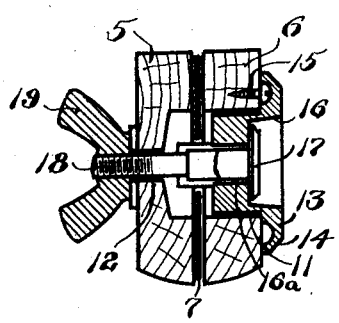
Fig. 2 is a sectional view on the line 2—2 of Fig. 1.
Figure 3:
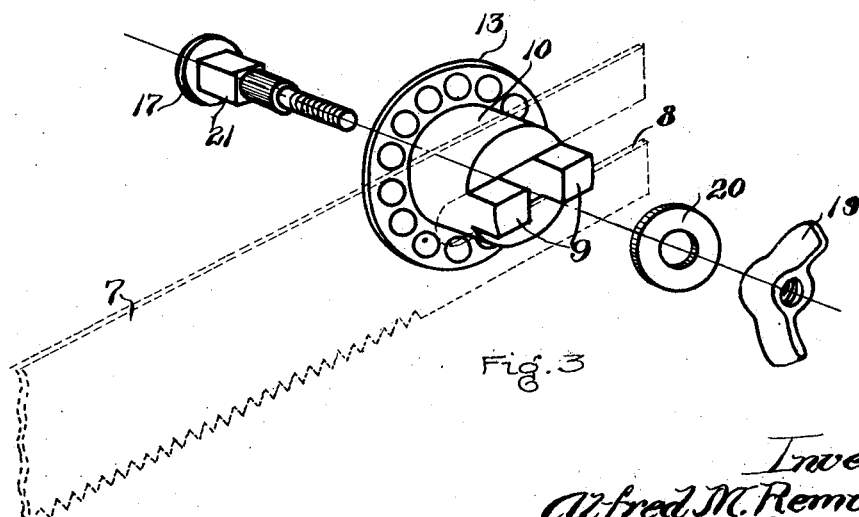
Fig. 3 is a perspective view showing the manner of assembling the different parts.

The parts are assembled as clearly indicated in Fig. 2 and Fig. 3, bolt 18 being first inserted in member 10 which is then placed in bore 11 of the handle, the threaded end of bolt 18 extending through hole 12 in jaw 5. Before tightening nut 19, blade 7 is inserted between the jaws 5 and 6 of the handle, slot 8 taking over both lugs 9. Upon tightening nut 19 jaws 5, 6 grip the blade firmly in the angular position determined by the lugs 9, flange 14, and the stud 15, which prevent rotation of the member 10 in the handle. Upon loosening nut 19 and turning the blade, the cylindrical member 10 is permitted to rotate with the blade, the countersinks 14 riding over stud 15 until the proper angular adjustment is made.

With the arrangement herein described the blade can be removed and turned on its longitudinal axis if desired, or a new blade with teeth of different size and pitch inserted. The saw can then be used in any situation, such as a corner, or where little room for a free stroke is permitted.

I claim:

1. A hand tool having a slotted blade and a handle angularly adjustable thereon, a locking sleeve extending through an opening in the handle into interlocking relationship with the blade, means fixed on said sleeve and handle for interlocking these two parts in fixed angular relationship when the sleeve is fully advanced into normal position, and means extending through said sleeve for clamping it in normal position.

2. A hand tool having a slotted blade and a handle angularly adjustable thereon, a locking sleeve extending through an opening in the handle into interlocking relationship with the blade, means fixed on said sleeve and handle for interlocking these two parts in fixed angular relationship when the sleeve is fully advanced into normal position, and means interlocking with said sleeve in fixed angular relationship therewith for holding it in normal position.

3. A compass saw having a bifurcated handle and a slotted blade, a member rotatably received in one bifurcated end of the handle, integral means on said member adapted to interlock both with the blade and with the handle, and means associated with said member for clamping the blade between the bifurcated ends of the handle and locking said member against rotation.

4. A hand tool having a bifurcated handle and a slotted blade, a cylindrical member received in one bifurcated end of the handle, lugs thereon extending across the space between the bifurcated ends to receive the slotted end of the blade whereby said member may be rotated in the handle by the blade, and means associated with said member for locking it against rotation and for securely holding the blade in any desired angular relation to the handle, including a clamping bolt received in an axial bore in said member.

5. A compass saw having a bifurcated handle and a blade slotted at one end, a cylindrical member received in one bifurcated end, a flange thereon contacting with the side of the handle, cooperating means on the handle and the flange to hold said member against rotation, an integral lug on said member received in the slot of the blade and means associated with said member to adjustably clamp the blade to the handle at any desired angle, and in either of two rotative positions of the blade in respect to its longitudinal axis.

6. A compass saw having a bifurcated handle and a slotted blade, a cylindrical member received in one bifurcated end, a flange thereon, countersinks on said flange cooperating with a stud on the handle to hold said member against rotation, an integral lug on said member received in the slot of the blade and means associated with said member to adjustably clamp the parts to the handle at any desired angle.

7. A compass saw having a handle bifurcated to provide clamping jaws and a slotted blade, a cylindrical member rotatably received in one bifurcated end, a circumferential flange on said member normally contacting with the handle, countersinks on the inner face of said flange, a stud on the handle cooperating with said countersinks to lock said member against rotation, lugs on said member extending across the space between the bifurcated ends of the handle to receive the slotted end of the blade, a squared bolt fitting in a squared axial opening in said member and having a threaded end extending between the lugs and through a hole in the other bifurcated end of the handle, and a nut on said bolt whereby the blade may be clamped to the handle in any desired position.

Signed by me at Fitchburg, Massachusetts, this 29th day of August, 1921.

ALFRED M. REMINGTON